United States Patent [19]

Kanemitsu et al.

[11] Patent Number: 4,996,603
[45] Date of Patent: Feb. 26, 1991

[54] IMAGE PROCESSING SYSTEM

[75] Inventors: Norio Kanemitsu; Yoshio Tabata, both of Kawasaki; Masaru Wakabayashi, Ishikawa, all of Japan

[73] Assignees: Fujitsu Limited, Kawasaki; PFU Limited, Ishikawa, both of Japan

[21] Appl. No.: 372,453

[22] Filed: Jun. 28, 1989

[30] Foreign Application Priority Data

Jun. 28, 1988 [JP] Japan .............................. 63-159621

[51] Int. Cl.⁵ .............................................. H04N 1/40
[52] U.S. Cl. ...................................... 358/462; 358/466
[58] Field of Search ................. 358/466, 456, 457, 462

[56] References Cited

U.S. PATENT DOCUMENTS 4,707,745 11/1987 Sakano ................................. 358/466

Primary Examiner—Edward L. Coles, Sr.
Attorney, Agent, or Firm—Staas & Halsey

[57] ABSTRACT

An image processing system for obtaining a binary signal from a multi-level signal read by an image scanner from an original document including mixed characters, ruled lines, and photos, and then obtaining a reproduced image from the binary signal, the image processing system including: a fixed slice processing unit for receiving said multi-level signal, and for slicing the multi-level signal by a predetermined fixed threshold level, and outputting the binary signal sliced by the fixed threshold level; a half-tone processing unit for receiving the multi-level signal, and for slicing the multi-level signal by a plurality of threshold levels defined by a dither method, and outputting the binary signal sliced by the plural threshold levels defined by the dither method; a character/photo separating unit for receiving the multi-level signal; and for detecting a pattern of the multi-level signal, separating either a character portion or photo portion based on the pattern, and outputting a selection signal; a selection unit for selecting either the fixed slice processing unit or the half-tone processing unit based on the selection signal from the character/photo separating unit.

7 Claims, 10 Drawing Sheets

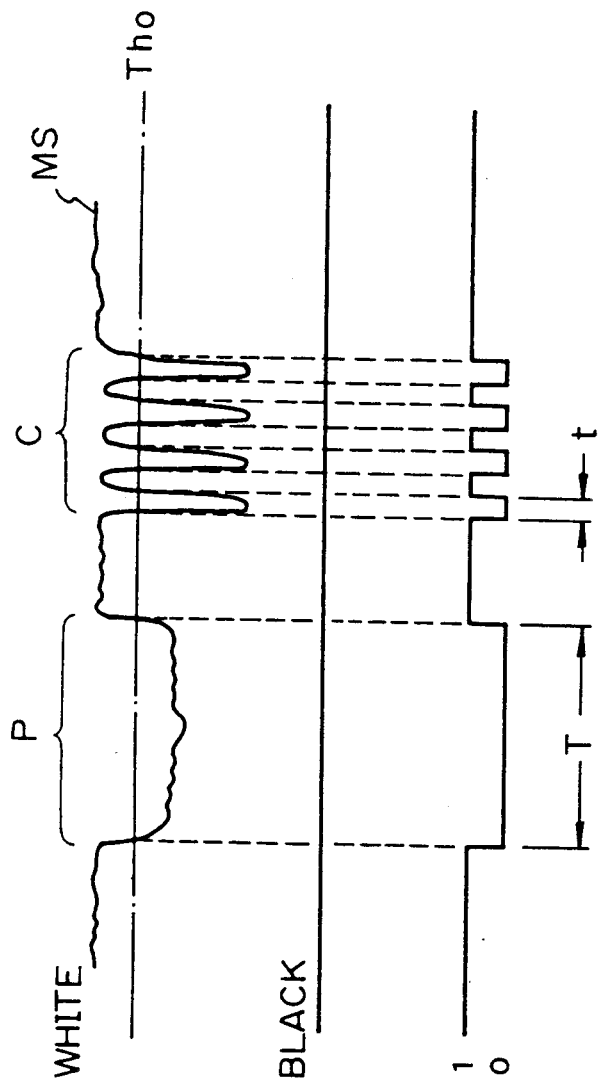
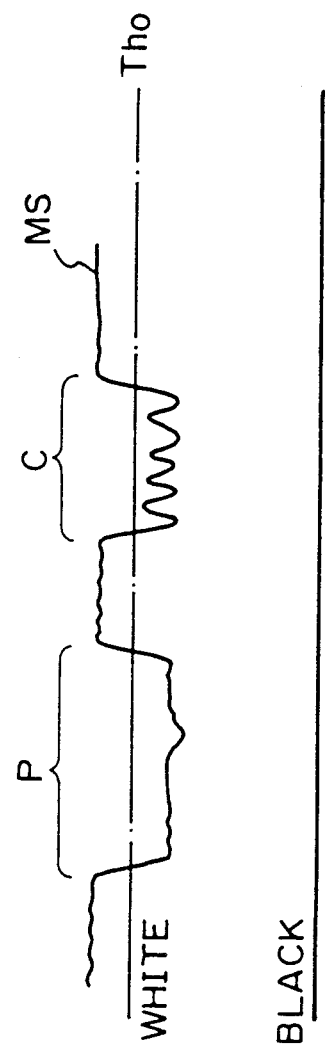
Fig. 5A
Fig. 5B
Fig. 5C

IMAGE PROCESSING SYSTEM

BACKGROUND OF THE INVENTION

1. Field of the Invention

The present invention relates to an image processing system enabling clear reproduction of an original document including mixed characters, ruled lines, and photos. The characters, ruled lines, and photos in the original document are scanned by an image scanner and a scanned image is converted to a multilevel signal and further converted to a binary signal. The original document is clearly reproduced based on processing of the binary signal according to the present invention.

2. Description of the Related Art

Image processing systems are widely used in the field of information processing systems. In image processing, a character can be easily converted to a binary signal based on a predetermined threshold level because the contrast of light and shade thereof is very clear. That is, for example, when the character portion (black portion) is a value "1", the remaining portion (white portion) is a value "0". Accordingly, when all areas of the document comprise only characters, the image processing of the original document is very easy.

When characters, ruled lines, and photos are mixed on one sheet of the original document, the image processing thereof is very troublesome because the photos contain half-tone colors such as gray colors so that the multi-level signal includes gray color areas, and fine lines of characters or ruled lines also become gray.

One known method for processing half-tone colors is called "dithering". In the dither method, the light and shade level of each pixel of the original image are compared with a plurality of threshold levels (variable threshold level), and ON/OFF of the display elements are determined based on the resultant data after comparison. In this case, each of threshold levels is selected at random at every pixel by using, for example, a table of random numbers.

Japanese Unexamined Patent Publication (Kokai) No. 58-3374 discloses a method for processing a half-tone color based on the density level of the black pixel. That is, this method includes steps for dividing the original image into a plurality of blocks, and for obtaining the difference between a maximum density level and a minimum density level in each block. When the difference value is larger than a predetermined threshold level, the area of such a block is binary-coded by a constant threshold level as a binary image area. When the difference value is smaller than a predetermined threshold level, this area is binary-coded by dithering as a half-tone area.

Japanese Unexamined Patent Publication (Kokai) No. 60-196068 discloses a method for determining either the binary image area or the half-tone area. This method includes the steps for binary-coding of the scanned data based on a plurality of threshold levels, for counting the number of the values "0" and "1" in each threshold level, for comparing the counted numbers with each threshold level, and for detecting a change of the counted numbers by comparing them with a previous number. Whether the binary image area or the half-tone image area is to be selected is determined from this change of the counted numbers.

SUMMARY OF THE INVENTION

The object of the present invention is to provide an image processing system enabling clear reproduction of an original document including mixed characters, ruled lines, and photos.

In accordance with the present invention, there is provided an image processing system for obtaining a binary signal from a multi-level signal read by an image scanner from an original document including mixed characters, ruled lines, and photos, then, obtaining a reproduction image from the binary signal, the image processing system including; a fixed slice processing unit for receiving the multi-level signal, and for slicing the multi-level signal by a predetermined fixed threshold level, and outputting the binary signal sliced by the fixed threshold level; a half-tone processing unit for receiving the multi-level signal, and for slicing the multi-level signal by a plurality of threshold levels defined by dithering, and outputting the binary signal sliced by the plural threshold levels defined by the dithering; a character/photo separating unit for receiving the multi-level signal, and for detecting a pattern of the multi-level signal, separating either a characters portion or photos portion based on the pattern, and outputting a selection signal; a selection unit for selecting either the fixed slice processing unit or the half-tone processing unit based on the selection signal from the character/photo separating unit.

BRIEF DESCRIPTION OF THE DRAWINGS

In the drawings:

FIGS. 5A, 5B and 5C are views for explaining a slicing state of a multi-level signal including characters and photos;

DESCRIPTION OF THE PREFERRED EMBODIMENTS

Before describing the preferred embodiments, problems in a conventional method are explained below in detail.

Figure 1:
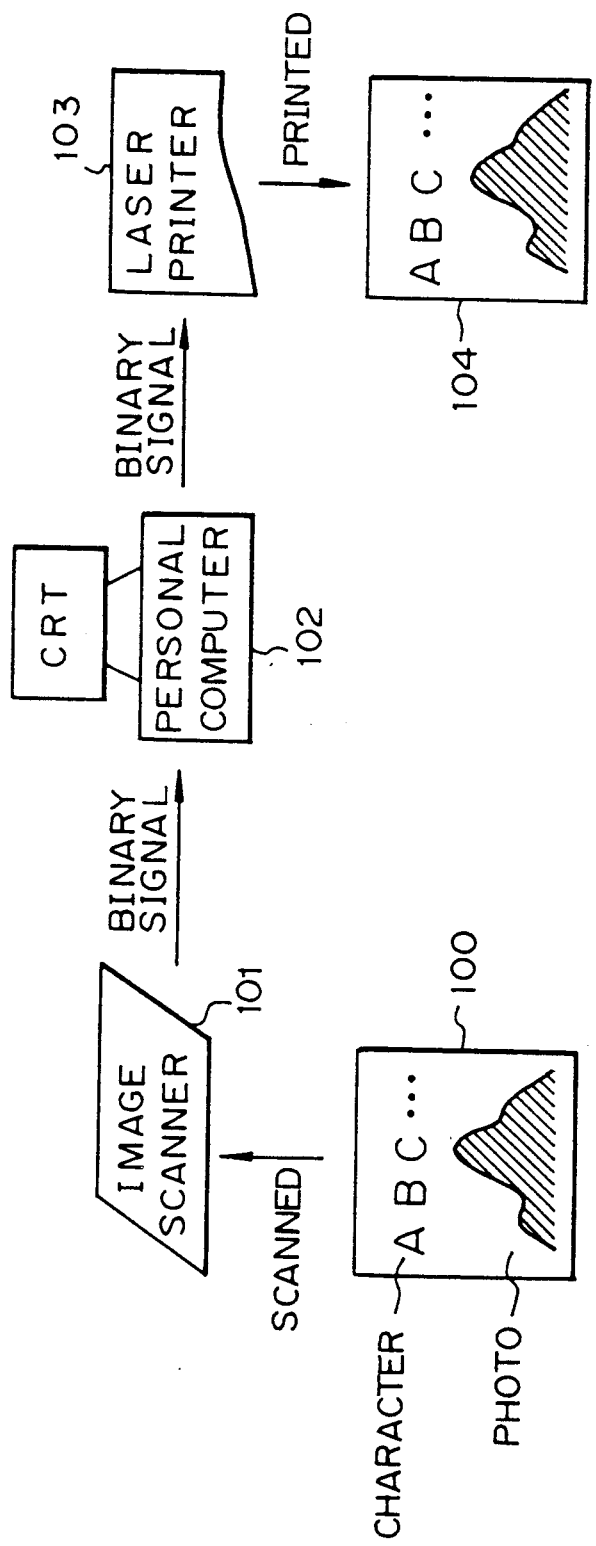
FIG. 1 is a schematic block diagram of a general image processing system.

FIG. 1 is a schematic block diagram of a general image processing system. In FIG. 1, reference number 100 denotes an original image of a document to be scanned, 101 an image scanner, 102 a personal computer with a display (CRT), 103 a laser printer and 104 an image reproduced by the printer. The original image includes characters, ruled lines, and photos. They are scanned by the image scanner 101 and converted to a multi-level signal and then converted to a binary signal having values of "0" or "1". The binary signal is input into the personal computer 102 and printed by the laser printer 103 so that the original image can be reproduced.

In this case, the scanned multi-level signal of the character portions of the original image 100 is binary-coded by the image scanner 101 based on a fixed slice level method having a step in which the multi-level signal is binary coded by the predetermined fixed threshold level. Further, the multi-level signal of the photo portions of the original image is binary-coded by the half-tone processing method based on dithering for binary coding the multi-level signal based on a predetermined dither pattern.

As explained above, the character and the photo portions are separately binary-coded by using the fixed slice level method and the half-tone processing method (dithering) This reason is explained as follows. That is, when both characters and photo are simultaneously binary-coded by the predetermined fixed threshold level, the photo portions cannot be clearly reproduced since the photo portions contain half-tone colors. In contrast, when both characters and photos are simultaneously binary-coded by dithering, the character portions cannot be clearly reproduced since the character portions comprise only two colors such as black and white colors.

In general, the photo portion has a tone gradation in half-tone colors. The gradation is expressed by a concentration of black dots.

Figure 2:
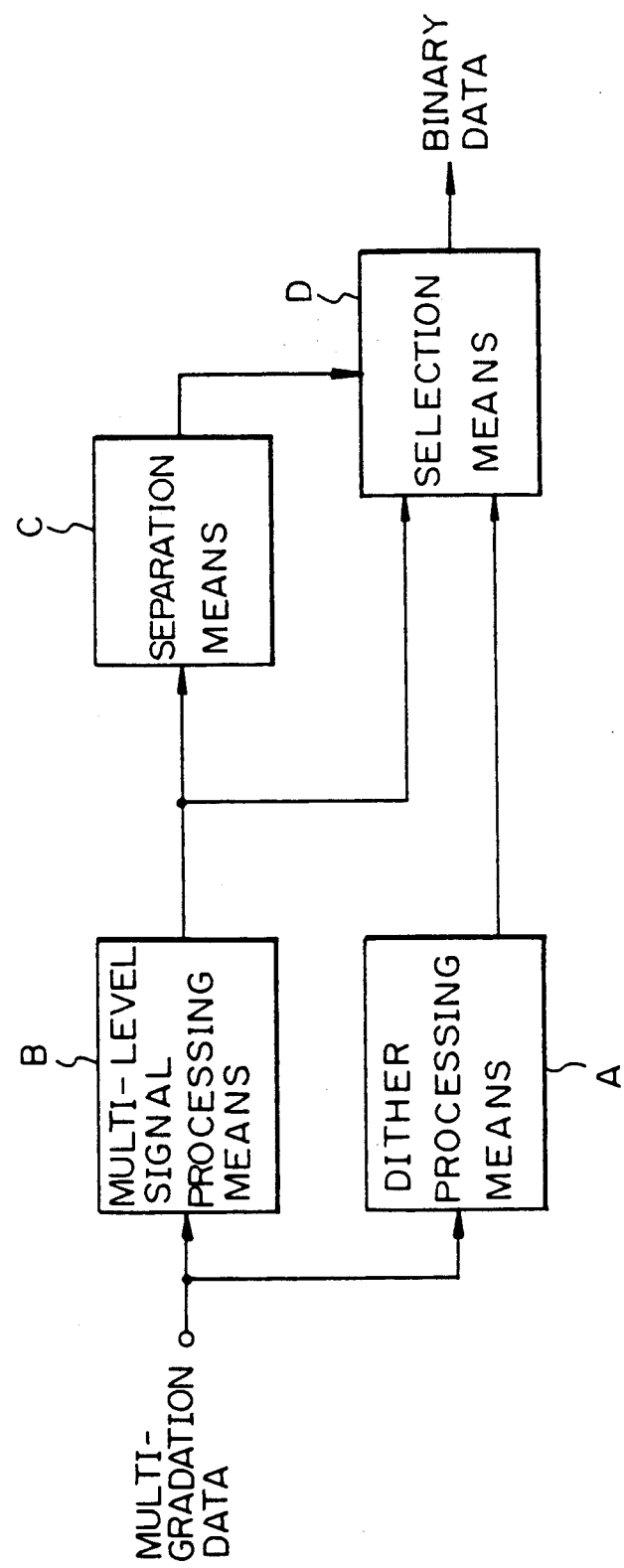
FIG. 2 is a schematic block diagram of a conventional image processing system.

FIG. 2 is a schematic block diagram of a conventional image processing system. This system is disclosed in Japanese Unexamined Patent Publication (Kokai) No. 61-221886. In FIG. 2, reference letter A denotes a dither processing means, B a multi-level signal processing means, C a separation means and D a selection means. The dither processing means A obtains a dither value from the multi-gradation data of each pixel of the image including characters and photos. The multi-level signal processing means B obtains multi-level data after comparing the multi-gradation data with at least two threshold. The separation means C separates each block of the image in accordance with either the binary image area or the half-tone image area. The selection means D selects the dither processing means A or the multi-level signal processing means B based on the resultant data from the separation means C.

The conventional system utilizes the characteristic by which the density gradation of the edge of the character is sharpened compared with that of the half-tone. Accordingly, each block of the image is separated based on the change of the density gradation of the edge as to whether the binary image area or the half-tone image area is selected.

However, when fine ruled lines are mixed among the character portions and the photo portions in the original image, these fine lines are not clearly reproduced as with the ruled lines in the above conventional system. This problem is explained below in derail.

Figure 3A:
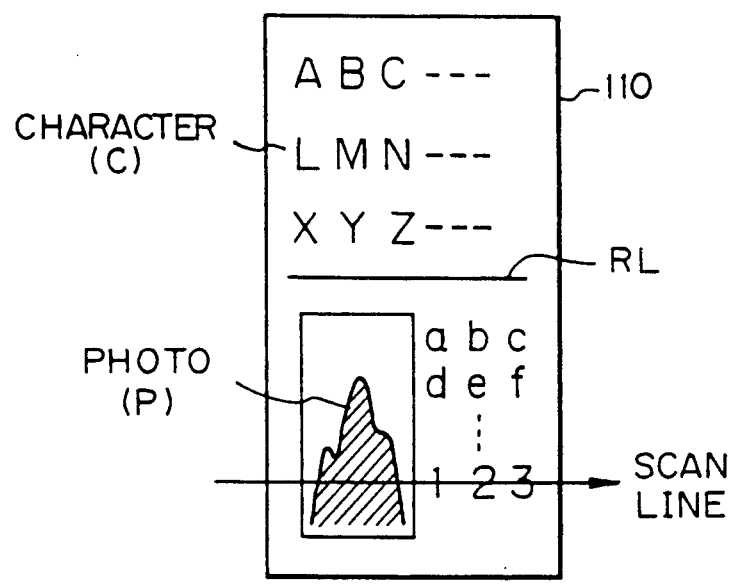
FIG. 3A is a view for explaining an original document including characters, photos, and ruled lines.
Figure 3B:
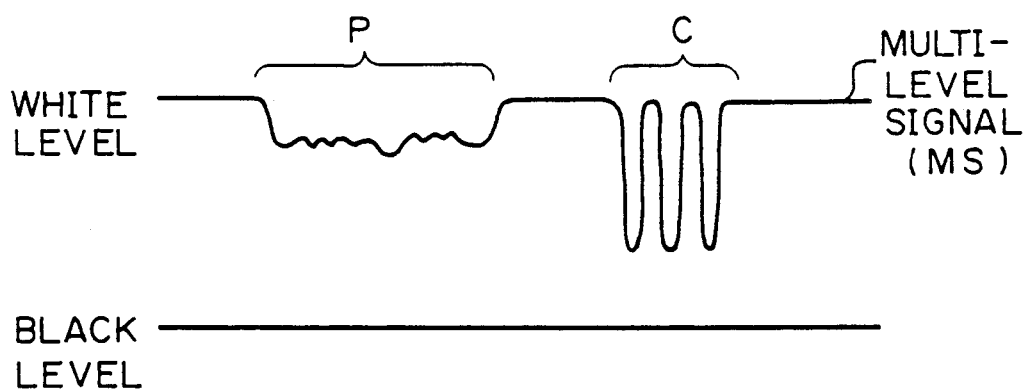
FIG. 3B is a view for explaining a multi-level signal including characters and photos.

FIGS. 3A is a view for explaining an original document including characters, photos, and ruled lines. FIG. 3B is a view for explaining the multi-level signal scanned along an arrow line shown in FIG. 3A. In FIG. 3A, 110 denotes an original image, and RL a ruled line. In this case, when the character portions C are binary-coded by the fixed slice level after converting to the multi-level signal, peak/valley portions thereof are clearly obtained. However, the ruled line and the photo portions P becomes unclear when using this fixed slice level because the multi-level signal MS of the photo portion includes gray colors. In contrast, when the photo portions are binary-coded by dithering, the character portions become unclear. Further, since the line width of the ruled line is very fine compared with that of one scan line of the image scanner, the image scanner cannot separate the ruled line.

An image processing system according to the present invention is explained in detail hereinafter.

Figure 4:
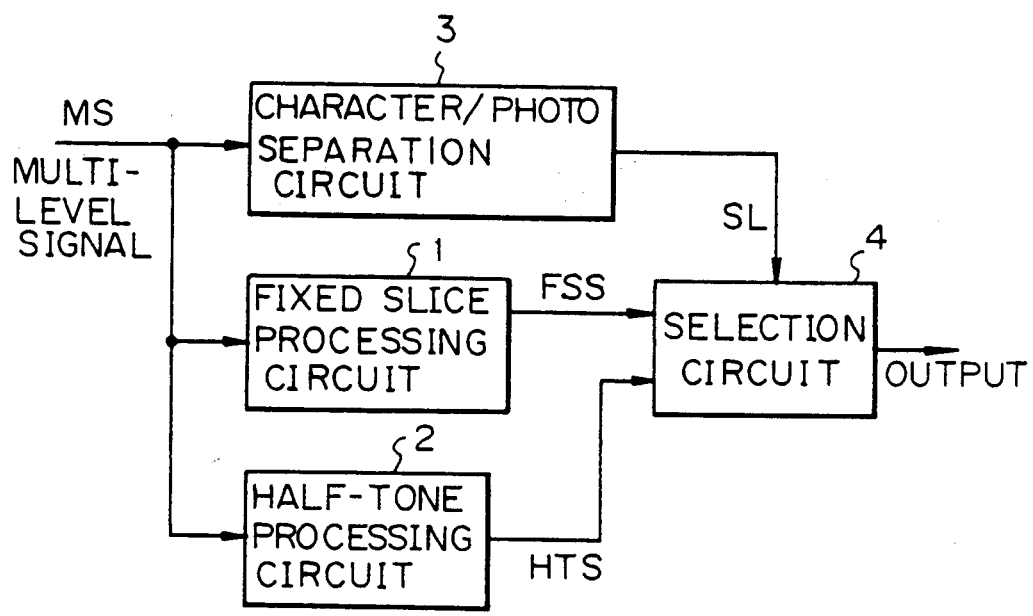
FIG. 4 is a schematic block diagram of an image processing system according to the present invention.

FIG. 4 is a schematic block diagram of an image processing system according to the present invention. In FIG. 4, reference number 1 denotes a fixed slice level processing circuit, 2 a half-tone processing circuit, 3 a character/photo separation circuit, and 4 a selection circuit. Further, FSS denotes a fixed slice signal, HTS denotes a half-tone signal, and MS denotes a multi-level signal, for example, sixty-four levels (values) indicating the density gradation of the color of the image.

In FIG. 4, the multi-level signal MS is input in parallel to the circuits 1 to 3. The outputs of the circuits 1 and 2, i.e., the fixed slice signal FSS and the half-tone signal HTS, are input to the circuit 4. The circuit 3 separates the multi-level signal MS as to whether the multi-level signal indicates a character portion or a photo portion. In the selection circuit 4, when the circuit 3 detects a character portion, the fixed slice signal FSS is selected. When the circuit 3 detects a photo portion, the half-tone signal HTS is selected.

FIGS. 5A, 5B and 5C are views for explaining a slicing state of the multi-level signal including characters and photos. Reference is a character portion, and P a photo portion. Further, $Th_0$ denotes a threshold level, and MS the multi-level signal. As shown in the drawing, the multi-level signal MS includes the gray colors in the photo portion P, and denotes clear white and black colors in the character portion C. When the multi-level signal MS is sliced by the threshold level $Th_0$ at which level is set in the neighborhood of the white level, the resultant data is obtained as shown in FIG. 5B. In this case, the value "0" is continued during the term T in the photo portion P, but "0" and "1" are repeated at every cycle "t" in the character portion C.

In the present invention, when the number of "0's" which occur in succession exceeds a predetermined reference value "$th_0$", this portion is determined as the photo portion P so that the half-tone signal HTS of FIG. 4 is selected as the half-tone image portion. Accordingly, when the number of "0's" does not exceed the predetermined reference value "$th_0$", this portion is determined as the character portion so that the fixed slice signal FSS is selected.

Figures 10A, 10B, 10C:
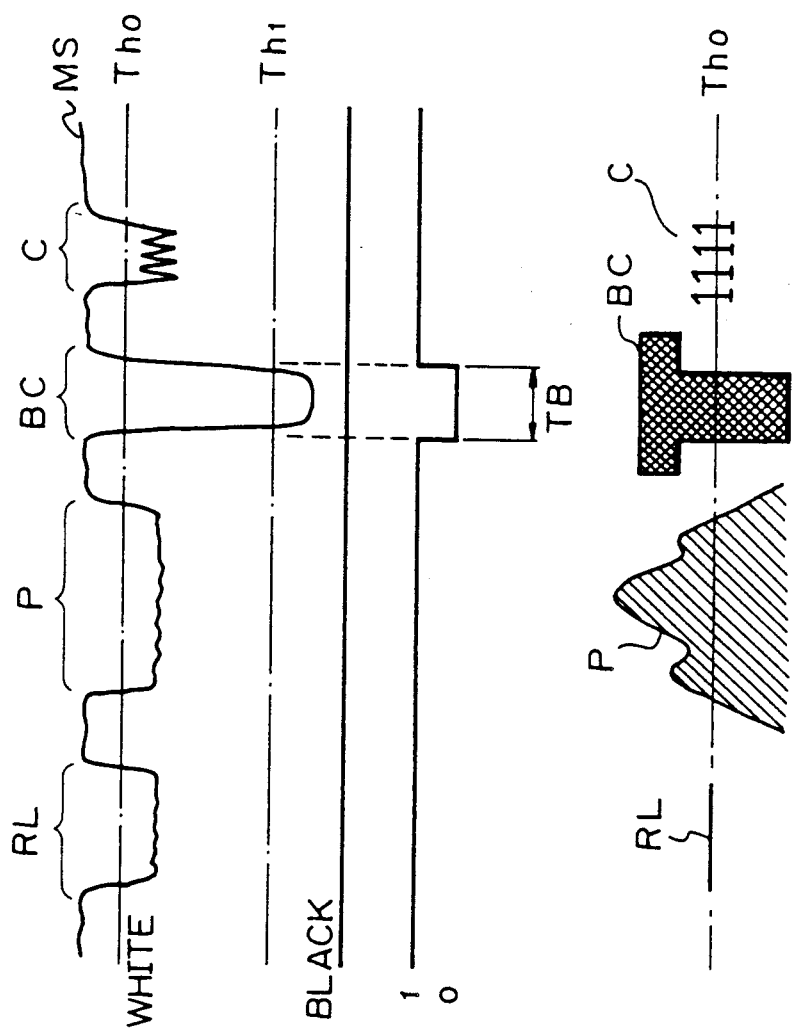
FIGS. 10A, 10B and 10C are views for explaining slicing state of a multi-level signal including ruled lines, photos, thick characters, and fine line characters.

Further, when a character is written by fine lines, the multi-level signal MS is shown by FIG. 5C (see, FIG. 10C). In this case, when the multi-level signal MS is sliced by the threshold level $Th_0$, the character portion C is incorrectly determined as the photo portion if the number of "0's" exceeds the reference value "$th_0$".

Accordingly, a fine line detection circuit is provided in the system to avoid the above mis-judgement.

Figure 6:
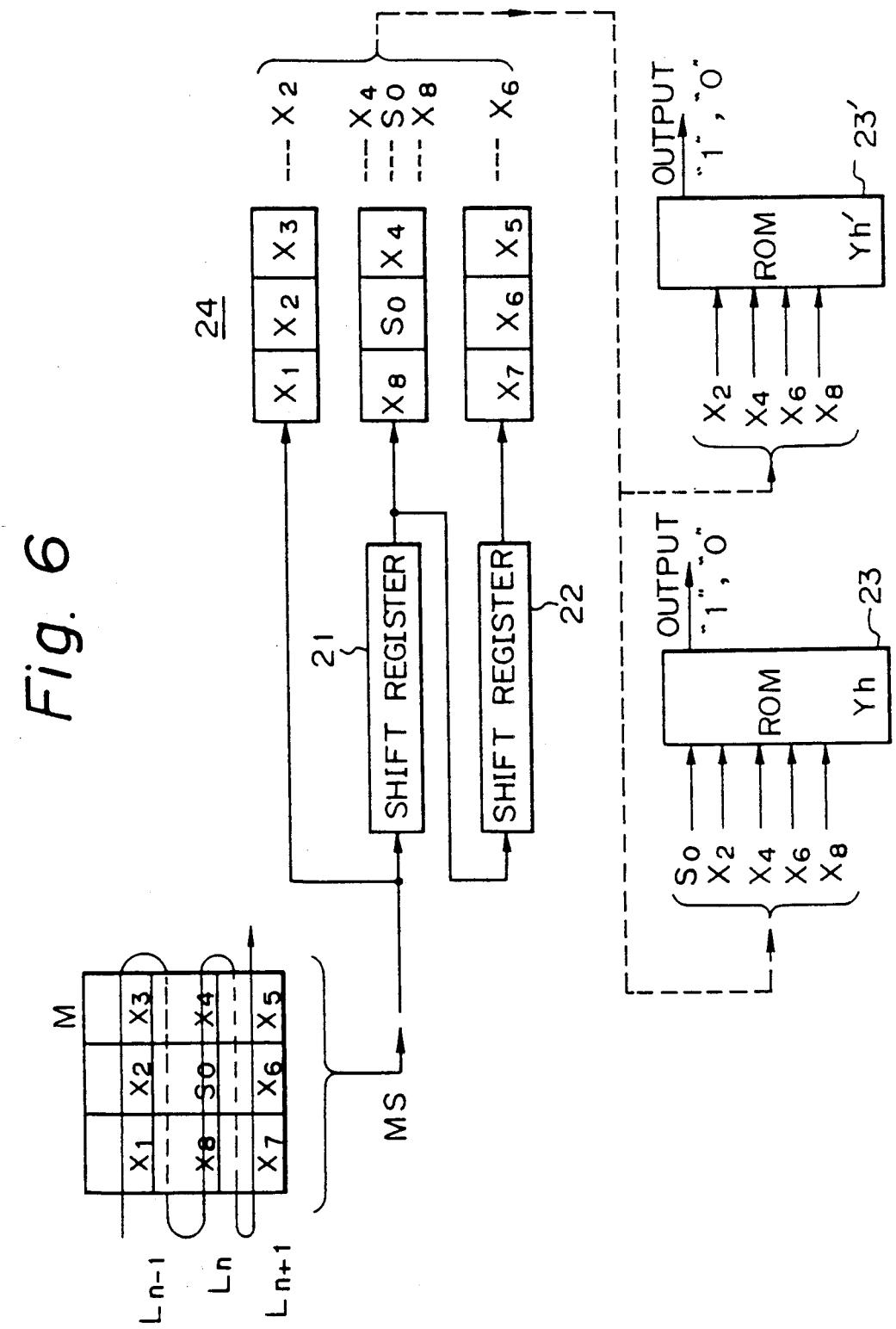
FIG. 6 is a schematic block diagram of a fine line detection circuit according to the present invention.

FIG. 6 is a schematic block diagram of a fine line detection circuit according to the present invention. This circuit is included in the character/photo separation circuit 3 in FIG. 4. In FIG. 6, M denotes a multi-level signal holding block, 21 and 22 shift registers, 23, a read only memory (ROM), and 24 a register group. References $X_1$ to $X_8$ and $S_0$ denote pixels each constituted by the multi-level signal. $S_0$ is a center pixel of this block. The fine line detection circuit is constituted by a differential circuit which detects a change of the light and shade of adjacent vertical and horizontal pixels relative to the center pixel. The differential circuit includes a primary differential circuit (ROM 23) and a secondary differential circuit (ROM 23'). In these circuits, the primary differential value $Y_1$ and the secondary differential value $Y_2$ are given as follows.

$$Y_1 = S_0 - \tfrac{1}{4}(X_2 + X_4 + X_6 + X_8) \quad (1)$$

$$Y_2 = |X_6 - X_2| + |X_8 - X_4| \quad (2)$$

Accordingly, to calculate the above formulas, first, the multi-level signals $X_4$, $S_0$ and $X_8$ (line Ln) are sent to the shift resister 21, and then the multilevel signals $X_5$, $X_6$, and $X_7$ (line Ln+1) are sent to the shift register 21. At the same time, the line Ln previously stored in the shift register 21 is shifted to the shift register 22. Further, the multi-level signals $X_1$, $X_2$ and $X_3$ (line Ln-1) are sent directly to the register group 24. As a result, a 3×3 matrix is obtained in the register group 24.

Each of the multi-level signals $X_2$, $X_4$, $X_6$, $X_8$, and $S_0$ is extracted from the register group 24 and input to the ROM 23 for calculating the formula (1). The ROM 23 has the function that the value "1" is output therefrom when the primary differential value $Y_1$ is equal to or larger than a threshold level Yh. Similarly, each of the multi-level signals $X_2$, $X_4$, $X_6$, and $X_8$ is extracted from the register group 24 and input to the ROM 23, for calculating the formula (2). The ROM 23' has the function that the value "1" is output therefrom when the secondary differential value $Y_2$ is equal to or larger than a threshold level Yh'.

Figure 7:
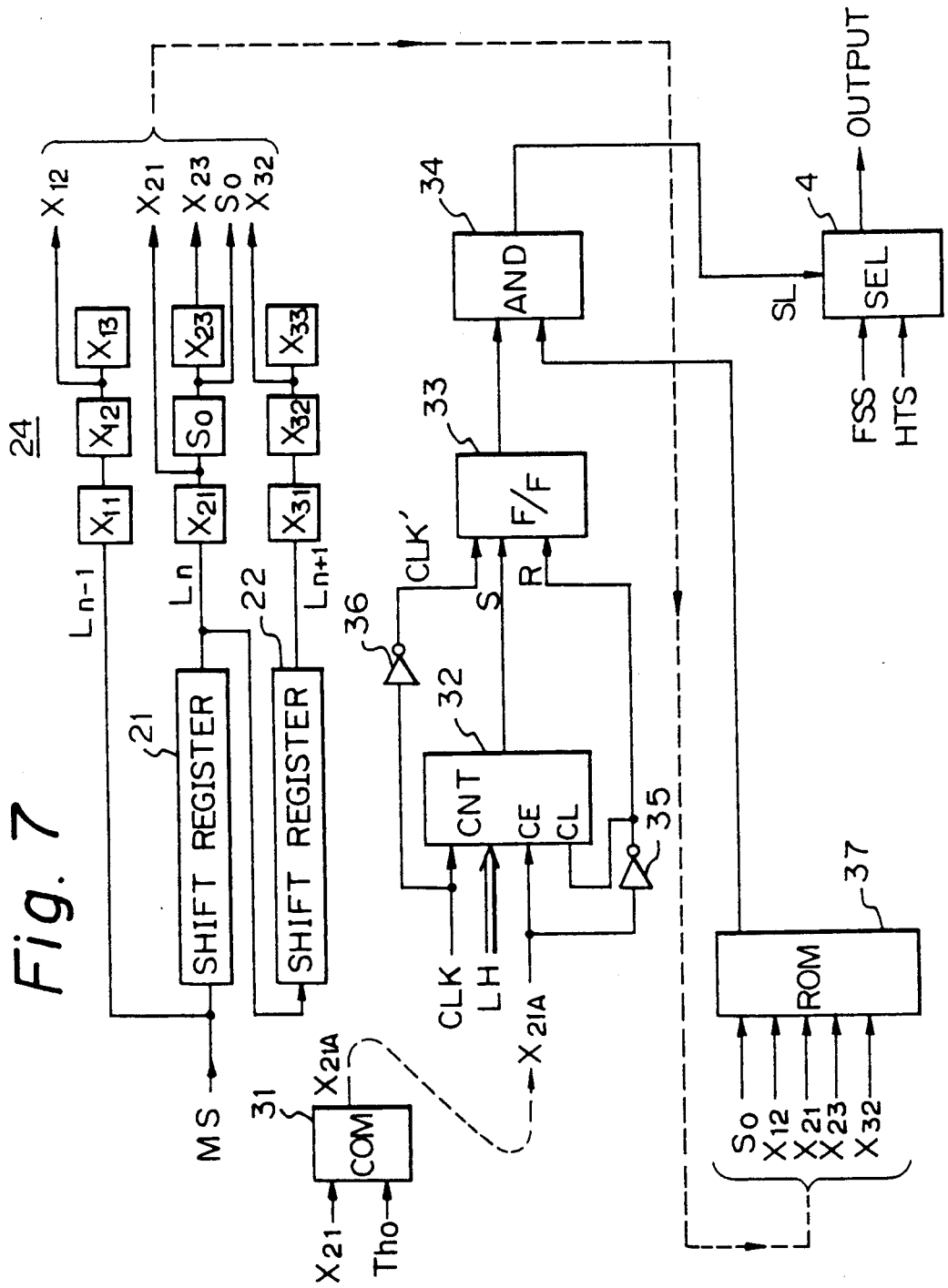
FIG. 7 is a schematic block diagram of a successive gray color detection circuit according to the present invention.

FIG. 7 is schematic block diagram of the successive gray color detection circuit according to the present invention. This circuit is also included in the character/photo separation circuit 3 in FIG. 4. This circuit is used for detecting number of "0's" during the term T in the photo portion of FIG. 5B. In FIG. 7, 21, 22, and 24 are the same elements as that of FIG. 6. Each of pixels $X_{11}$ to $X_{33}$ correspond to $X_1$ to $X_8$ in FIG. 6. Reference number 31 denotes a comparator, 32 a counter, 33 a flip-flop circuit, 34 an AND gate, and 35 an inverter.

First, the threshold level $Th_0$ and the multi-level signal $X_{21}$ of the center line are input into the comparator 31 and the signal $X_{21}$ is compared with the threshold level $Th_0$ so that the binary signal $X_{21A}$ is output from the comparator 31. The threshold level $Th_0$ is the same as that of FIG. 5A. The binary signal $X_{21A}$ is input into the counter 32. the counter 32 is upcounted when the binary signal $X_{21A}$ is the value "1". Further, a reference value LH and a clock signal CLK are input into the counter 32. The output "1" of the counter 32 is obtained when the count number thereof is equal to or larger than the reference value LH. This reference value LH is used for separating either the character or the photo and is previously determined to be a larger value than the successive number of the binary signal $X_{21A}$ at the character portion.

Accordingly, when the multi-level signals are sequentially input into the comparator 31 in response to the clock signal CLK of the scanning direction, the output binary signal $X_{21A}$ becomes "1" in succession when the photo portions are scanned. The counter 32 is up-counted when the value "1" is input. When the count number of the counter 32 reaches the reference value LH, the counter 32 outputs the value "1". The value "1" from the counter 32 is continued while the binary signal $X_{21A}$ is the value "1". The value "1" is input to the flip-flop circuit (F/F) 33 and the value "1" is also output from the flip-flop circuit 33. Accordingly, the flip-flop circuit 33 outputs the value "1" in the photo portions.

Meanwhile, when the original image is not a photo portion, the binary signal $X_{21A}$ becomes the value "0" and the value "0" is inverted to the value "1" by the inverter 35. The value "1" from the inverter 35 is input to the clear terminal CL of the counter 32 so that the counter 32 is reset. Further, the flip-flop circuit 33 is also reset when the counter 32 is reset. The clock signal CLK is inverted by the inverter 36 and the inverted clock signal CLK' is input to the flip-flop circuit 33.

The ROM 37 constitutes a part of the differential circuit and corresponds to the ROM 23 of the thin line detection circuit in FIG. 6. The ROM 37 includes an inversion function, and outputs the value "1" in the photo portion. This value "1" is input to the AND gate 34. The output of the AND gate 34 is applied to the selection circuit 4. When the value "1" is applied from the AND gate 34 to the selection circuit 4, the selection circuit 4 selects the half-tone processing circuit 2 in FIG. 4. In contrast, when the value "0" is applied from the AND gate 34 to the selection circuit 4, the selection circuit 4 selects the fixed slice level circuit 1.

Figure 8:
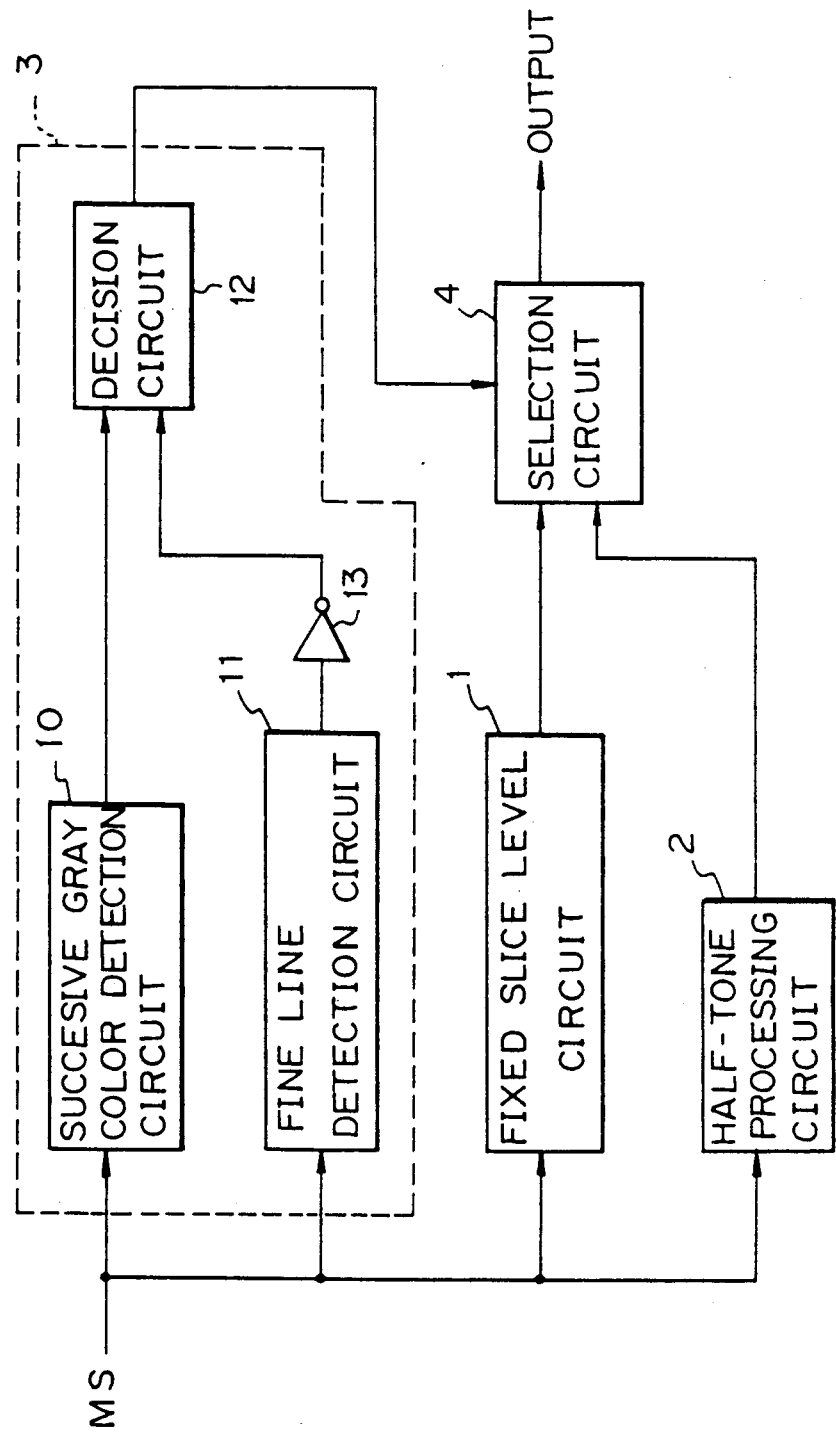
FIG. 8 is a schematic block diagram of an image processing system according to one embodiment of the present invention.

FIG. 8 is a schematic block diagram of the image processing system according to one embodiment of the present invention. In FIG. 8, the character/photo separation circuit 3 in FIG. 4 is constituted by the successive gray color detection circuit 10 (see, FIG. 7), the thin line detection circuit 11 (see, FIG. 6), the decision circuit 12 and the inverter 13. The fixed slice level circuit 1, the half-tone processing circuit 2 and the selection circuit 4 are the same as that of FIG. 4.

The successive gray color detection circuit 10 is mainly constituted by the counter 32 and the flip-flop circuit 33 in FIG. 7 and detects the photo portions in the original images. The fine line detection circuit 11 is mainly constituted by the ROM 23 in FIG. 6 and detects either the character portion or the ruled line from the multi-level signal.

The decision circuit 12 is mainly constituted by the AND gate 34 and outputs the value "1" as the selection signal SL to the selection circuit 4 when the multi-level signal $S_0$ indicates a photo portion. The selection circuit 4 selects the half-tone signal HTS from the half-tone processing circuit 2. When the selection signal SL is the value "0", the selection circuit 4 selects the fixed slice signal FSS from the fixed slice level circuit 1. Accordingly, the decision circuit 12 outputs the value "1" when the successive gray color detection circuit 10 detects the photo portions and outputs the value "1", further, when the fine line detection circuit 11 detects "non-character and ruled line portions" and outputs the value "0" and further outputs the value "1" from the inverter 13.

Figure 9:
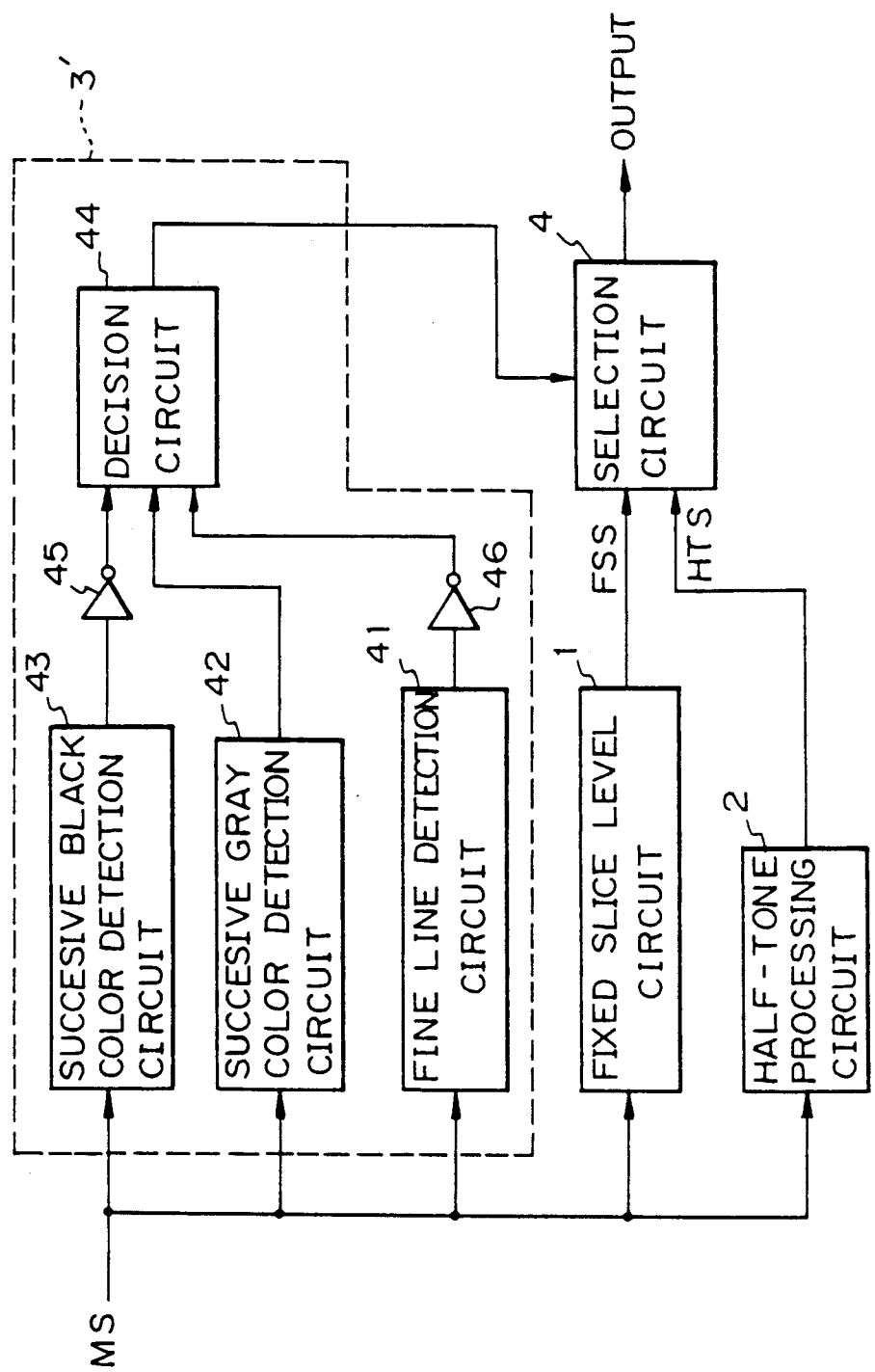
FIG. 9 is a schematic block diagram of an image processing system according to another embodiment of the present invention.

FIG. 9 is a schematic block diagram of the image processing system according to another embodiment of the present invention. In FIG. 9, the character/photo separation circuit 3, is constituted by the fine line detection circuit 41 (see, FIG. 6), the successive gray color detection circuit 42 (see, FIG. 7), a successive black color detection circuit 43, the decision circuit 44 and the inverters 45 and 46. The fixed slice level circuit 1, the half-tone processing circuit 2 and the selection circuit 4 are the same as that of FIG. 4. The successive black color detection circuit 43 is provided for detecting thick character portions in the multi-level signal.

The decision circuit 44 outputs the value "1" when the circuit 43 outputs the value "0" and the inverter 45 outputs the inverted value "1", when the circuit 42 outputs the value "1", and when the circuit 41 outputs the value "0" and the inverter 46 outputs the inverted value "1". The selection circuit 4 selects the halftone signal HTS of the half-tone processing circuit 2 when the value "1" is input thereinto. In contrast, the selection circuit 4 selects the fixed slice signal FSS of the fixed slice level circuit 1 when the value "0" is input thereinto.

FIGS. 10A, 10B and 10C are views for explaining the slicing state of the multi-level signal including ruled lines, photos, thick line characters, and fine line characters. In FIG. 10A, C is a character portion comprised of fine lines, for example, "1111" in FIG. 10C. BC is also a character portion, but comprised of thick lines, for example, "T" in FIG. 10C. RL is the ruled line portion shown in FIG. 10C, and P is the photo portion shown in FIG. 10C. Further, $Th_0$ denotes the first threshold level, and $Th_1$ denotes the second threshold level. As shown in the drawing, the multi-level signal MS denotes the gray color in the portions of the photo P, the ruled line RL, and the fine line characters C. The multi-level signal MS denotes clear white and black colors in the thick line character portion BC. When the multi-level signal MS is sliced by the threshold levels $Th_0$ and $Th_1$. In this case, the threshold level $Th_0$ is set in the neighborhood of the white level, and the threshold level $Th_1$ is set in the neighborhood of the black level. Accordingly, the thick character portion BC is sliced by the threshold level $Th_1$ and the successive value of "0" can be obtained during the term TB. The thick character portions are detected by the successive black color detection circuit 43 in FIG. 9.

Figure 11:
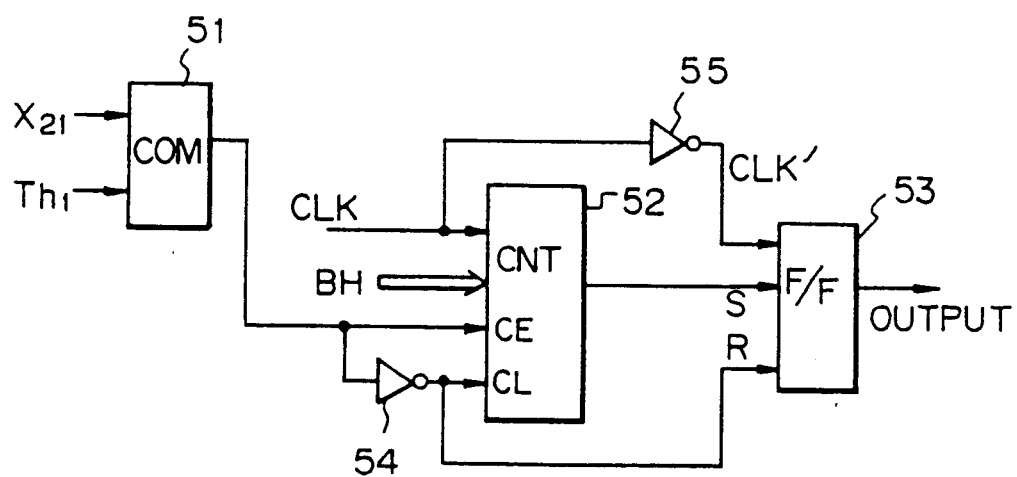
FIG. 11 is one embodiment of a successive black color detection circuit in FIG. 9.

FIG. 11 is one embodiment of the successive black color detection circuit 43 in FIG. 9. In FIG. 11, reference number 51 denotes a comparator, 52 a counter, 53 a flip-flop circuit, and 54, 55 inverters. The counter 51 compares the multi-level signal $X_{21A}$ with the threshold level $Th_1$. When the multi-level signal $X_{21A}$ is equal to or larger than the threshold level $Th_1$ (that is, the multi-level signal $X_{21A}$ is near to the black, the counter 51 outputs the value "1".

The counter 52 counts the number of "1's" which are successively output from the comparator 51. When number of "1's" exceeds the reference value BH, the counter outputs the value "1" and this value is input into the flip-flop circuit 53. The flip-flop circuit 53 outputs the value "1" when the value "1" is input. Meanwhile, when the comparator 51 outputs the value "1", the value "1" is inverted to "0" by the inverter 54 and input to the clear terminal CL of the counter 52. Further, the inverted "0" is also input to the reset terminal of the flip-flop circuit 53 so that this circuit is reset. In this case, the reference value BH is smaller than the reference value LH shown in FIG. 7. According to the results of an experiment, the reference value BH is larger than the value 0.3 mm, and the reference value LH is larger than the value 0.5 mm.

We claim:

1. An image processing system for obtaining a binary signal from a multi-level signal read by an image scanner from an original document including mixed characters, ruled lines, and photos, and then obtaining a reproduced image from said binary signal, said image processing system comprising;
   fixed slice processing means for receiving said multi-level signal, for slicing said multi-level signal by a predetermined fixed threshold level, and for outputting said binary signal sliced by said fixed threshold level;
   half-tone processing means for receiving said multi-level signal, for slicing said multi-level signal by a plurality of threshold levels defined by a dither method, and for outputting said binary signal sliced by said plurality of threshold levels defined by said dither method;
   character/photo separating means for receiving said multi-level signal, for detecting a pattern of said multi-level signal, for separating either a character portion or a photo portion based on said pattern and for outputting a selection signal, said character/photo separating means comprises a successive gray color detection circuit for receiving said multi-level signal, and for obtaining binary signals after slicing said multi-level signal based on said fixed threshold level, and detecting a number of said binary signals occurring in succession within one line of said binary signal; and a fine line detection circuit for receiving said multi-level signal, and for detecting a change of density level of said multi-levels signal between adjacent lines; and
   selection means for selecting either said fixed slice processing means or said half-tone processing means based on said selection signal from said character/photo separating means.

2. An image processing system as claimed in claim 1, wherein said successive gray color detection circuit has a plurality of detection circuits each having either said first threshold level or said second threshold level.

3. An image processing system as claimed in claim 1, wherein said fine line detection circuit comprises a primary differential circuit and a secondary differential circuit, each inputting a multi-level signal from a plurality of lines.

4. An image processing system as claimed in claim 1, wherein said character/photo separating means further comprises a decision means for determining either a character portion or photo portion based on outputs from said successive gray color detection circuit and said fine line detection circuit.

5. An image processing system as claimed in claim 1, wherein said fixed threshold level in said successive gray color detection circuit is set to either a first threshold level or a second threshold level, said first threshold level being set in the neighborhood of a white color, and said second threshold level being set in the neighborhood of a black color.

6. An image processing system as claimed in claim 4, wherein said successive gray color detection circuit has a plurality of detection circuits each having either said first threshold level or said second threshold level.

7. An image processing system as claimed in claim 5, wherein said successive gray color detection circuit has a plurality of detection circuits each having either said first threshold level or said second threshold level.

* * * * *